United States Patent
Lee et al.

(10) Patent No.: US 11,879,028 B2
(45) Date of Patent: Jan. 23, 2024

(54) ACRYL-BASED COPOLYMER COMPOSITION, METHOD OF PREPARING THE SAME, AND ACRYL-BASED COPOLYMER BLEND COMPRISING THE SAME

(71) Applicant: LG Chem, Ltd., Seoul (KR)

(72) Inventors: Ji Young Lee, Daejeon (KR); Yong Seok Jung, Daejeon (KR); Jung Su Han, Daejeon (KR); Sang Jin Shin, Daejeon (KR)

(73) Assignee: LG Chem, Ltd.

( * ) Notice: Subject to any disclaimer, the term of this patent is extended or adjusted under 35 U.S.C. 154(b) by 381 days.

(21) Appl. No.: 17/271,972

(22) PCT Filed: Sep. 1, 2020

(86) PCT No.: PCT/KR2020/011702
§ 371 (c)(1),
(2) Date: Feb. 26, 2021

(87) PCT Pub. No.: WO2021/071093
PCT Pub. Date: Apr. 15, 2021

(65) Prior Publication Data
US 2021/0388137 A1    Dec. 16, 2021

(30) Foreign Application Priority Data

Oct. 8, 2019 (KR) .......... 10-2019-0124437
Aug. 7, 2020 (KR) .......... 10-2020-0098996

(51) Int. Cl.
| | | |
|---|---|---|
| C08F 220/18 | (2006.01) | |
| C08F 220/28 | (2006.01) | |
| C08F 2/16 | (2006.01) | |
| C08G 77/46 | (2006.01) | |

(52) U.S. Cl.
CPC .. *C08F 220/1802* (2020.02); *C08F 220/1804* (2020.02); *C08F 220/283* (2020.02); *C08F 2/16* (2013.01); *C08G 77/46* (2013.01)

(58) Field of Classification Search
None
See application file for complete search history.

(56) References Cited

U.S. PATENT DOCUMENTS

2009/0264572 A1*  10/2009  Liao .......... C09D 7/67
                                                524/506
2012/0270041 A1*  10/2012  Matsumoto .......... C09J 175/04
                                                428/354
2012/0302674 A1   11/2012  Ogawa et al.
2013/0040871 A1    2/2013  Becker et al.
2019/0085106 A1    3/2019  Hong et al.

FOREIGN PATENT DOCUMENTS

| CN | 104861340 A | * | 8/2015 | ............. C08K 13/02 |
|---|---|---|---|---|
| CN | 104861340 A | | 8/2015 | |
| CN | 107001719 A | | 8/2017 | |
| EP | 3549962 A1 | | 10/2019 | |
| JP | 08283535 A | * | 10/1996 | |
| JP | H1112427 A | | 1/1999 | |
| JP | 2010285603 A | | 12/2010 | |
| JP | 2013531550 A | | 8/2013 | |
| JP | 6296583 B1 | * | 3/2018 | |
| JP | 6296583 B1 | | 3/2018 | |
| KR | 20110068197 A | | 6/2011 | |
| KR | 101339384 B1 | | 12/2013 | |
| KR | 101718576 B1 | | 3/2017 | |
| KR | 20180015797 A | | 2/2018 | |
| KR | 20190085931 A | | 7/2019 | |
| WO | 2017043891 A1 | | 3/2017 | |
| WO | 2019113406 A1 | | 6/2019 | |

OTHER PUBLICATIONS

JP-08283535-A, Oct. 1996, Machine translation (Year: 1996).*
JP-6296583-B1, Mar. 2018, Machine translation (Year: 2108).*
Korean Search Report for International Application No. PCT/KR2020/011702, dated Oct. 12, 2020, 3 pages.
Hyungu Im et al., "Study on the Electrical Conductivity in Polysiloxane/Metal Composite Containing Metal Oxide", Journal of the Korean Industrial and Engineering Chemistry, vol. 20, No. 3, 2009, pp. 307-312. (English abstract only).
Search Report dated Jun. 2, 2022 from Office Action for Chinese Application No. 202080004708.8 dated Jun. 9, 2022. 2 pgs.

* cited by examiner

*Primary Examiner* — Satya B Sastri

(74) *Attorney, Agent, or Firm* — Lerner David LLP

(57) ABSTRACT

An acryl-based copolymer composition is provided. The acryl-based copolymer composition includes an acryl-based copolymer, an aggregation inducing agent, and an aggregating agent, wherein the acryl-based copolymer includes a (meth)acrylic acid alkyl ester monomer-derived repeating unit, a (meth)acrylic acid alkoxy alkyl ester monomer-derived repeating unit, and a crosslinkable monomer-derived repeating unit. The aggregation inducing agent includes a siloxane-based monomer-derived repeating unit and an ether-based monomer-derived repeating unit, and the aggregating agent includes a monovalent ionic metal salt.

12 Claims, No Drawings

ACRYL-BASED COPOLYMER COMPOSITION, METHOD OF PREPARING THE SAME, AND ACRYL-BASED COPOLYMER BLEND COMPRISING THE SAME

CROSS-REFERENCE TO RELATED APPLICATIONS

The present application is a national stage entry under 35 U.S.C. § 371 of International Application No. PCT/KR2020/011702 filed on Sep. 1, 2020, which claims priority to Korean Patent Application No. 10-2019-0124437 filed on Oct. 8, 2019 and Korean Patent Application No. 10-2020-0098996 filed on Aug. 7, 2020, the entire contents of which are incorporated in their entirety by reference.

TECHNICAL FIELD

The present invention relates to an acryl-based copolymer composition, and more particularly, to an acryl-based copolymer composition having excellent water resistance, a method of preparing the same, and an acryl-based copolymer blend comprising the same

BACKGROUND ART

A rubber component used in a vehicle is only 5% of the total weight of the vehicle, but is mainly used for an important part that determines performance of the vehicle. Due to the properties of rubber, it has been used as an important component for a portion where vibration and noise occur and a portion where a heat resistance and an oil resistance are required. In particular, a small-vehicle engine requiring high power requires materials having excellent heat resistance and oil resistance.

Among various special rubbers, the acrylic rubber is a rubber having (meth)acrylic acid alkyl ester as a main monomer unit, and has excellent heat resistance and oil resistance. Thus, the acrylic rubber is not only used as a component material for a seal, a hose, a tube, a belt, etc. in vehicle-related fields, etc., but also used as an adhesive, and thus is widely used as a material for a rubber component. The acrylic rubber is crosslinked to impart elasticity for use as a rubber component, and for this purpose, a crosslinkable monomer having an active crosslinking point is copolymerized therewith. Crosslinkable acrylic rubber in which such a crosslinkable monomer is copolymerized is generally mixed with a filler, such as carbon black, or a crosslinking agent, etc. to prepare a crosslinkable acrylic rubber composition, and is molded into a molded body having a desired shape to be used for various purposes.

The crosslinkable acrylic rubber, which has been used for various purposes as described above, requires excellent water resistance along with excellent heat resistance and oil resistance. However, the crosslinkable acrylic rubber is subjected to salt aggregation to have a high ratio of an aggregate and an emulsifier with respect to a final aggregate, thereby deteriorating the water resistance.

DISCLOSURE

Technical Problem

The present invention has been made in an effort to use an aggregation inducing agent that enables aggregation with a monovalent ionic metal salt instead of a divalent ionic metal salt previously used as an aggregating agent during the aggregation for the preparation of an acryl-based copolymer, thereby improving water resistance.

That is, an object of the present invention is to prepare an acryl-based copolymer composition in which the residual amounts of an emulsifier in an aggregate after washing with water are reduced by reducing bonding strength between a metal salt aggregating agent and the emulsifier during the aggregation of the acryl-based copolymer, and thus to provide an acryl-based copolymer blend having excellent water resistance.

Technical Solution

In one general aspect, there is provided an acryl-based copolymer composition comprising an acryl-based copolymer, an aggregation inducing agent, and an aggregating agent, wherein the acryl-based copolymer includes a (meth)acrylic acid alkyl ester monomer-derived repeating unit, a (meth)acrylic acid alkoxy alkyl ester monomer-derived repeating unit, and a crosslinkable monomer-derived repeating unit, the aggregation inducing agent includes a siloxane-based monomer-derived repeating unit and an ether-based monomer-derived repeating unit, and the aggregating agent includes a monovalent ionic metal salt.

In another general aspect, there is provided a method of preparing an acryl-based copolymer composition including: preparing an acryl-based copolymer by polymerizing a monomer mixture including a (meth)acrylic acid alkyl ester monomer, a (meth)acrylic acid alkoxy alkyl ester monomer, and a crosslinkable monomer; and adding an aggregation inducing agent and an aggregating agent to the acryl-based copolymer, wherein the aggregation inducing agent includes a siloxane-based monomer-derived repeating unit and an ether-based monomer-derived repeating unit, and the aggregating agent includes a monovalent ionic metal salt.

In another general aspect, there is provided an acryl-based copolymer blend comprising the acryl-based copolymer composition and a filler.

Advantageous Effects

By using the aggregation inducing agent according to the present invention, the aggregation of the acryl-based copolymer is induced to enable aggregation with a monovalent ionic metal salt and to reduce a content of an emulsifier in an aggregate accordingly, thereby having excellent water resistance.

BEST MODE

The terms and words used in the detailed description and claims should not be interpreted as being limited to conventional or dictionary meanings, but should be interpreted as having meanings and concepts meeting the technical ideas of the present invention based on a principle that the inventors can appropriately define the concepts of terms in order to describe their own inventions in the best mode.

The term "-derived repeating unit" used herein may refer to a component, a structure thereof, or a substance itself, resulting from a substance. As specific examples, "-derived repeating unit" may refer to a repeating unit in which an added monomer participates in a polymerization reaction and is formed in a polymer, during the polymerization of the polymer.

The term "rubber" used herein may refer to a plastic material having elasticity, and may refer to rubber, elastomer, synthetic latex, etc.

The term "copolymer" used herein may refer to all copolymers formed by copolymerization of a comonomer, and as specific examples, may refer to both a random copolymer and a block copolymer.

Hereinafter, the present invention will be described in more detail to assist in understanding the technical idea of the present invention.

An acryl-based copolymer composition according to the present invention may comprise an acryl-based copolymer, an aggregation inducing agent, and an aggregating agent.

According to an exemplary embodiment of the present invention, the acryl-based copolymer may include a (meth) acrylic acid alkyl ester monomer-derived repeating unit, a (meth)acrylic acid alkoxy alkyl ester monomer-derived repeating unit, and a crosslinkable monomer-derived repeating unit.

According to an exemplary embodiment of the present invention, the (meth)acrylic acid alkyl ester monomer-derived repeating unit is a component that increases a workability, a heat resistance, and a cold resistance in a final product by adjusting a glass transition temperature in the acryl-based copolymer, and may be a (meth)acrylic acid alkyl ester monomer-derived repeating unit containing an alkyl group having 1 to 8 carbon atoms. In this case, the alkyl group having 1 to 8 carbon atoms may refer to a linear or cyclic alkyl group having 1 to 8 carbon atoms. Specific examples of the (meth)acrylic acid alkyl ester monomer for forming the (meth)acrylic acid alkyl ester monomer-derived repeating unit may include methyl (meth)acrylate, ethyl (meth)acrylate, propyl (meth)acrylate, isopropyl (meth) acrylate, n-butyl (meth)acrylate, isobutyl (meth) acrylate, n-amyl (meth) acrylate, isoamyl (meth) acrylate, n-hexyl (meth) acrylate, 2-ethylhexyl (meth)acrylate, cyclohexyl (meth)acrylate, etc. Here, the (meth)acrylic acid alkyl ester monomer may be used alone or in combination of two or more of those mentioned above, and more specific examples of the (meth)acrylic acid alkyl ester monomer may include an ethyl (meth)acrylate monomer and an n-butyl (meth) acrylate monomer.

A content of the (meth)acrylic acid alkyl ester monomer-derived repeating unit in the acryl-based copolymer may be 65 wt % to 93 wt %, 75 wt % to 90 wt %, or 80 wt % to 90 wt %. In this range, a product prepared from the acryl-based copolymer composition according to the present invention may have excellent workability, heat resistance, oil resistance, and cold resistance.

According to an exemplary embodiment of the present invention, the (meth)acrylic acid alkoxy alkyl ester monomer-derived repeating unit is a component that increases a workability, a heat resistance, and a cold resistance in a final product by adjusting a glass transition temperature in the acryl-based copolymer, and may refer to a (meth)acrylic acid alkoxy alkyl ester monomer-derived repeating unit containing an alkoxy alkyl group having 1 to 8 carbon atoms. Specific examples of the (meth)acrylic acid alkoxy alkyl ester monomer for forming the (meth)acrylic acid alkoxy alkyl ester monomer-derived repeating unit may include methoxymethyl (meth)acrylate, ethoxymethyl (meth) acrylate, 2-ethoxyethyl (meth) acrylate, 2-butoxyethyl (meth)acrylate, 2-methoxyethyl (meth)acrylate, 2-propoxyethyl (meth) acrylate, 3-methoxypropyl (meth) acrylate, 4-methoxybutyl (meth) acrylate, etc. Specific examples of the (meth)acrylic acid alkoxy alkyl ester monomer may include 2-methoxyethyl (meth)acrylate. A content of the (meth)acrylic acid alkoxy alkyl ester monomer-derived repeating unit in the acryl-based copolymer may be 5 wt % to 35 wt %, 7 wt % to 25 wt %, or 10 wt % to 20 wt %. In this range, a product prepared from the acryl-based copolymer composition according to the present invention may have excellent workability and oil resistance.

According to an exemplary embodiment of the present invention, the total content of the (meth)acrylic acid alkyl ester monomer-derived repeating unit and the (meth)acrylic acid alkoxy alkyl ester monomer-derived repeating unit included in the acryl-based copolymer may be 80 wt % to 99.9 wt %, 85 wt % to 99.9 wt %, or 90 wt % to 99.5 wt %. In this range, a product prepared from the acryl-based copolymer composition according to the present invention may have excellent workability, cold resistance, and heat resistance.

According to an exemplary embodiment of the present invention, the crosslinkable monomer-derived repeating unit is a component for imparting a crosslinkable functional group in the acryl-based copolymer, and the crosslinkable monomer for forming the crosslinkable monomer-derived repeating unit may include at least one selected from the group consisting of a butenedionic acid monoester monomer, an epoxy group-containing monomer, and a halogen-containing monomer.

The butenedionic acid monoester monomer may be a maleic acid monoester monomer or a fumaric acid monoester monomer obtained by reacting an alcohol with a carboxyl group of butenedionic acid, that is, maleic acid or fumaric acid. The maleic acid monoester monomer may be a maleic acid monoalkyl ester monomer such as monomethyl maleate, monoethyl maleate, monopropyl maleate, monobutyl maleate, monopentyl maleate, and monodecyl maleate; a maleic acid monocycloalkyl ester monomer such as monocyclopentyl maleate, monocyclohexyl maleate, monocycloheptyl maleate, monocyclooctyl maleate, monomethyl cyclohexyl maleate, mono-3,5-dimethylcyclohexyl maleate, monodicyclopentanyl maleate, and monoisobornyl maleate; and a maleic acid monocycloalkenyl ester monomer such as monocyclopentenyl maleate, monocyclohexenyl maleate, monocycloheptenyl maleate, monocyclooctenyl maleate, and dicyclopentadienyl maleate. The fumaric acid monoester monomer may be a fumaric acid monoalkyl ester monomer such as monomethyl fumarate, monoethyl fumarate, monopropyl fumate, monobutyl fumarate, monohexyl fumarate, and monooctyl fumarate; a fumaric acid monocycloalkyl ester monomer such as monocyclopentyl fumarate, monocyclohexyl fumarate, monocycloheptyl fumarate, monocyclooctyl fumarate, monomethyl cyclohexyl fumarate, mono-3,5-dimethylcyclohexyl fumarate, dicyclopentanyl fumarate, and isobonyl fumarate; and a fumaric acid monocycloalkenyl ester monomer such as monocyclopentenyl fumarate, monocyclohexenyl fumarate, monocycloheptenyl fumarate, monocyclooctenyl fumarate, and monodicyclopentadienyl fumarate.

The epoxy group-containing monomer may be glycidyl (meth)acrylate, vinyl glycidyl ether, allyl glycidyl ether, methacryl glycidyl ether, etc. Specific examples of the epoxy group-containing monomer may include glycidyl (meth) acrylate, allyl glycidyl ether, etc.

The halogen-containing monomer may be vinyl chloroacetate, vinyl bromo acetate, allyl chloro acetate, vinyl chloro propionate, vinyl chloro butyrate, vinyl bromo butyrate, 2-chloroethyl acrylate, 3-chloro propylacrylate, 4-chlorobutyl acrylate, 2-chloroethyl methacrylate, 2-bromo ethyl acrylate, 2-iodine ethyl acrylate, 2-chloroethyl vinyl ether, chloro methyl vinyl ether, 4-chloro-2-butenyl acrylate, vinyl benzyl chloride, 5-chloromethyl-2-norbornene, 5-chloroacetoxy methyl-2-norbornene, etc. Specific examples of the halogen-containing monomer may include vinyl chloroacetate, vinyl benzyl chloride, 2-chloroethyl acrylate, 2-chloroethyl vinyl ether, etc.

A content of the crosslinkable monomer-derived repeating unit in the acryl-based copolymer may be 0.1 wt % to 20 wt %, 0.1 wt % to 15 wt %, or 0.5 wt % to 10 wt %. In this range, the acryl-based copolymer according to the present invention may have a high crosslinking density and an excellent mechanical property, the obtained crosslinked product may have improved elongation, and compression set may be prevented.

According to an exemplary embodiment of the present invention, the acryl-based copolymer may further include another monomer-derived repeating units capable of copolymerizing with the (meth)acrylic acid alkyl ester monomer-derived repeating unit and the (meth)acrylic acid alkoxy alkyl ester monomer-derived repeating unit, in addition to the (meth)acrylic acid alkyl ester monomer-derived repeating unit, the (meth)acrylic acid alkoxy alkyl ester monomer-derived repeating unit, and the crosslinkable monomer-derived repeating unit.

The copolymerizable other monomer-derived repeating unit may be an ethylenically unsaturated nitrile monomer-derived repeating unit.

The ethylenically unsaturated nitrile monomer-derived repeating unit is a component that further improves heat resistance of the final product, and may be acrylonitrile, methacrylonitrile, 2-chloropropene nitrile, 2-butenenitrile, etc. Specific examples of the ethylenically unsaturated nitrile monomer may be acrylonitrile.

When the acryl-based copolymer includes the ethylenically unsaturated nitrile monomer-derived repeating unit, a content of the ethylenically unsaturated nitrile monomer-derived repeating unit in the acryl-based copolymer may be 0.001 wt % to 20 wt %, 0.01 wt % to 10 wt %, or 0.1 wt % to 10 wt %. In this range, a product prepared from the acryl-based copolymer composition according to the present invention may have excellent heat resistance.

According to an exemplary embodiment of the present invention, the aggregation inducing agent is to reduce the residual amounts of the emulsifier after the aggregation by enabling aggregation through an aggregating agent including a monovalent ionic metal salt, and may be formed of a copolymer including a siloxane-based monomer-derived repeating unit and an ether-based monomer-derived repeating unit. According to an exemplary embodiment of the present invention, the siloxane-based monomer for forming the siloxane-based monomer-derived repeating unit may include at least one selected from the group consisting of dimethyl siloxane, methyl-phenyl siloxane, and methyl-vinyl siloxane. Specific examples of the siloxane-based monomer may include siloxane.

According to an exemplary embodiment of the present invention, an ether-based monomer for forming the ether-based monomer-derived repeating unit may include at least one selected from the group consisting of paraformaldehyde, ethylene glycol, propylene glycol, tetramethylene glycol, oxymethylene, ethylene oxide, propylene oxide, and tetrahydrofuran. Specific examples of the ether-based monomer may include two or more of those mentioned above, and may include ethylene glycol and propylene glycol.

According to an exemplary embodiment of the present invention, the aggregation inducing agent may further include an olefin-based monomer-derived repeating unit.

An olefin-based monomer for forming the olefin-based monomer-derived repeating unit may include at least one selected from the group consisting of ethylene, propylene, 1-butene, 1-pentene, 4-methyl-1-pentene, 1-hexene, 1-heptene, 1-octene, 1-decene, 1-undecene, 1-dodecene, 1-tetradecene, 1-hexadecene, 1-eicosene, norbornene, norbornadiene, ethylidene norbornene, phenyl norbornene, vinyl norbornene, dicyclopentadiene, butadiene, 1,5-pentadiene, 1,6-hexadiene, styrene, alpha-methyl styrene, divinylbenzene, and 3-chloromethylstyrene. As specific examples, the olefin-based monomer for forming the olefin-based monomer-derived repeating unit may include ethylene and butadiene.

When the aggregation inducing agent includes the olefin-based monomer-derived repeating unit, a content of the olefin-based monomer-derived repeating unit in the aggregation inducing agent may be 0.001 wt % to 20 wt %, 0.01 wt % to 10 wt %, or 0.1 wt % to 5 wt %. In this range, the acryl-based copolymer composition according to the present invention may have excellent water resistance.

According to an exemplary embodiment of the present invention, the aggregation inducing agent may have a weight average molecular weight of 1,000 g/mol to 200,000 g/mol. For example, the aggregation inducing agent may have a weight average molecular weight of 5,000 g/mol to 200,000 g/mol, 5,000 g/mol to 150,000 g/mol, or 5,000 g/mol to 100,000 g/mol. In this range, the acryl-based copolymer composition according to the present invention may have excellent water resistance.

According to an exemplary embodiment of the present invention, the aggregation inducing agent may include a siloxane-based copolymer represented by the following Formula 1:

[Formula 1]

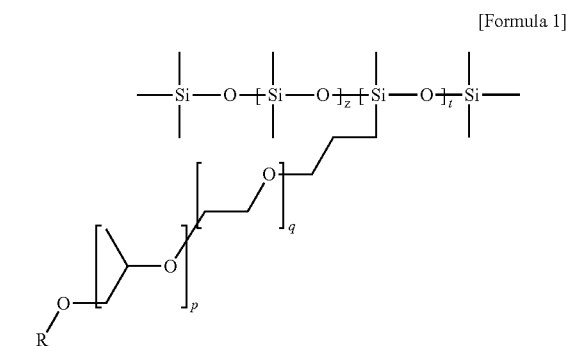

wherein z is an integer from 5 to 50, t is an integer from 1 to 10, q is an integer from 5 to 50, p is an integer from 5 to 50, and R is hydrogen or an alkyl group having 1 to 10 carbon atoms.

As specific examples, z may be an integer of 5 to 50, 10 to 40, or 15 to 35, t may be an integer of 1 to 10, 1 to 8, or 1 to 5, q may be an integer of 5 to 50, 10 to 45, or 20 to 40, p may be an integer of 5 to 50, 10 to 45, or 20 to 40, and r may be hydrogen or an alkyl group having 1 to 3 carbon atoms. In this range, the acryl-based copolymer composition according to the present invention may have excellent water resistance.

The content of the siloxane-based copolymer represented by Formula 1 may be 0.1 to 10 parts by weight based on 100 parts by weight of the total acryl-based copolymer. For example, the content of the siloxane-based copolymer represented by Formula 1 may be 1 part by weight to 10 parts by weight, 1 part by weight to 7 parts by weight, or 1 part by weight or 5 parts by weight based on 100 parts by weight of the total acryl-based copolymer. In this range, the acryl-based copolymer composition according to the present invention may have excellent water resistance.

According to an exemplary embodiment of the present invention, the aggregating agent is for inducing aggregation of the acryl-based copolymer, and the monovalent ionic metal salt may be a salt containing a monovalent ionic metal when dissolved in water. For example, the aggregating agent may include a salt containing at least one metal selected from the group consisting of lithium, sodium, and potassium. As specific examples, the aggregating agent may include at least one selected from the group consisting of metal chlorides such as sodium chloride and lithium chloride; nitrates such as sodium nitrate, potassium nitrate, and lithium nitrate; and sulfates such as sodium sulfate, potassium sulfate, and lithium sulfate. As specific examples, the aggregating agent may include sodium sulfate.

According to an exemplary embodiment of the present invention, the aggregating agent may further include divalent and trivalent ionic metal salts. The divalent and trivalent ionic metal salts may be metal salts containing at least one metal selected from the group consisting of magnesium, calcium, zinc, titanium, manganese, iron, cobalt, nickel, aluminum, and tin.

The aggregating agent may be included in an amount of 3 parts by weight to 30 parts by weight based on 100 parts by weight of the total acryl-based copolymer. For example, the aggregating agent may be included in an amount of 3 parts by weight to 25 parts by weight, 10 parts by weight to 25 parts by weight, or 15 parts by weight to 25 parts by weight based on 100 parts by weight of the total acryl-based copolymer. In this range, the aggregation of the acryl-based copolymer may be effectively induced and the residual amounts of the aggregating agent and emulsifier in the acryl-based copolymer composition may be reduced, thereby improving water resistance.

According to an exemplary embodiment of the present invention, the residual amounts of the aggregating agent in the acryl-based copolymer composition may be 10,000 ppm or less. For example, the residual amounts of the aggregating agent in the acryl-based copolymer composition may be 0.1 ppm to 10,000 ppm, 0.1 ppm to 8,000 ppm, or 0.1 ppm to 5,000 ppm. In this range, the water resistance of the acryl-based copolymer composition may be improved.

According to an exemplary embodiment of the present invention, the residual amounts of the emulsifier in the acryl-based copolymer composition may be 30,000 ppm or less. For example, the residual amounts of the emulsifier in the acryl-based copolymer composition may be 0.1 ppm to 20,000 ppm, 0.1 ppm to 19,000 ppm, or 0.1 ppm to 18,000 ppm. In this range, the water resistance of the acryl-based copolymer composition may be improved.

According to an exemplary embodiment of the present invention, the acryl-based copolymer composition may have a Mooney viscosity ($ML_{1+4}$, 100° C.) of 10 to 70, 20 to 60, or 25 to 50. In this range, the final product may have excellent workability.

According to the present invention, there is provided a method of preparing an acryl-based copolymer composition. As an example of the method for preparing the acryl-based copolymer composition, there is provided a method of preparing an acryl-based copolymer composition including: preparing an acryl-based copolymer by polymerizing a monomer mixture including a (meth)acrylic acid alkyl ester monomer, a (meth)acrylic acid alkoxy alkyl ester monomer, and a crosslinkable monomer; and adding an aggregation inducing agent and an aggregating agent to the acryl-based copolymer composition, wherein the aggregation inducing agent includes a siloxane-based monomer-derived repeating unit and an ether-based monomer-derived repeating unit, and the aggregating agent includes a monovalent ionic metal salt.

According to an exemplary embodiment of the present invention, the preparing of the acryl-based copolymer may be a step for preparing a main chain of the acryl-based copolymer, and the type and content of each monomer forming the monomer mixture added in the preparing of the acryl-based copolymer may be the same as those of each monomer for forming each monomer-derived repeating unit included in the acryl-based copolymer described above.

The polymerization of the acryl-based copolymer may be performed using methods such as emulsion polymerization, bulk polymerization, suspension polymerization, and solution polymerization, and may be performed using an emulsion polymerization method such as a batch type, a semi-batch type, or a continuous type by additionally using an additive such as an initiator, an emulsifier, a polymerization terminator, an ion exchange water, a molecular weight regulator, an activator, and a redox catalyst.

The initiator may include, for example, an inorganic peroxide such as sodium persulfate, potassium persulfate, ammonium persulfate, potassium perphosphate, and hydrogen peroxide; an organic peroxide such as diisopropylbenzene hydroperoxide, t-butyl hydroperoxide, cumene hydroperoxide, p-menthane hydroperoxide, di-t-butyl peroxide, t-butylcumyl peroxide, acetyl peroxide, isobutyl peroxide, octanoyl peroxide, benzoyl peroxide, 3,5,5-trimethylhexanol peroxide, and t-butyl peroxy isobutyrate; and a nitrogen compound such as azobis isobutyronitrile, azobis-2,4-dimethylvaleronitrile, azobiscyclohexanecarbonitrile, and azobis methyl isobutyrate. These polymerization initiators may be used alone or in combination of two or more of those mentioned above. These initiators may be used in an amount of 0.005 parts by weight to 0.2 parts by weight based on 100 parts by weight of the monomer mixture.

Meanwhile, the organic or inorganic peroxide initiator may be combined with a reducing agent and used as a redox-based polymerization initiator. The reducing agent is not particularly limited, but may be a metal ion-containing compound in a reduced state such as ferrous sulfate and cuprous naphthenate; a sulfonic acid compound such as sodium methanesulfonate; and an amine compound such as dimethylaniline. These reducing agents may be used alone or in combination of two or more of those mentioned above. The reducing agent may be used in an amount of 0.03 parts by weight to 20 parts by weight based on 1 part by weight of the peroxide.

The emulsifier may be at least one selected from the group consisting of an anion-based emulsifier, a cation-based emulsifier, and a nonion-based emulsifier. Specific examples of the emulsifier may include a nonionic emulsifier such as polyoxyethylene alkyl ether, polyoxyethylene alkylphenol ether, polyoxyethylene alkyl ester, and polyoxyethylene sorbitan alkyl ester; an anionic emulsifier, for example, a salt of fatty acid such as lauric acid, myristic acid, palmitic acid, oleic acid, and linolenic acid, an alkyl benzene sulfonate such as sodium dodecyl benzene sulfonate, higher alcohol sulfate ester salt, and alkyl sulfosuccinate; a cationic emulsifier such as alkyl trimethyl ammonium chloride, dialkylammonium chloride, and benzyl ammonium chloride; and a copolymerizable emulsifier such as a sulfo ester of $\alpha,\beta$-unsaturated carboxylic acid, a sulfate ester of $\alpha,\beta$-unsaturated carboxylic acid, and sulfo alkyl aryl ether. Among them, the anionic emulsifier may be suitable. The emulsifier may be used in an amount of 0.1 parts by weight to 10 parts by weight based on 100 parts by weight of the monomer mixture.

Water may be used as the ion exchange water, and the ion exchange water may be used in an amount of 100 parts by weight to 400 parts by weight based on 100 parts by weight of the monomer mixture.

The molecular weight regulator may include, for example, mercaptans such as a-methylstyrene dimer, t-dodecyl mercaptan, n-dodecyl mercaptan, and octyl mercaptan; a halogenated hydrocarbon such as carbon tetrachloride, methylene chloride, and methylene bromide; and a sulfur-containing compound such as tetraethyl thiuram disulfide, dipentamethylene thiuram disulfide, and diisopropylxanthogen disulfide. The molecular weight regulator may be used in an amount of 0.01 parts by weight to 3 parts by weight based on 100 parts by weight of the monomer mixture.

The activator may include, for example, at least one selected from the group consisting of sodium hydrosulfite, sodium metabisulfite, sodium formaldehyde sulfoxylate, sodium ethylenediamine tetraacetate, ferrous sulfate, lactose, dextrose, sodium linoleate, and sodium sulfate. The activator may be used in an amount of 0.01 parts by weight to 0.15 parts by weight based on 100 parts by weight of the monomer mixture.

The redox catalyst may include, for example, sodium formaldehyde sulfoxylate, ferrous sulfate, disodium ethylenediamine tetraacetate, cupric sulfate, etc. The redox catalyst may be used in an amount of 0.01 parts by weight to 0.1 parts by weight based on 100 parts by weight of the monomer mixture.

According to an exemplary embodiment of the present invention, the adding of the aggregation inducing agent and aggregating agent is a step of including the aggregation inducing agent in the acryl-based copolymer before the aggregation. In this case, the adding of the aggregation inducing agent and aggregating agent may include adding an aggregation inducing agent to the acryl-based copolymer; and adding an aggregating agent to the acryl-based copolymer to which the aggregation inducing agent is added.

In the adding of the aggregation inducing agent to the acryl-based copolymer, a method of adding the aggregation inducing agent to the acryl-based copolymer is not particularly limited, and the acryl-based copolymer may be in a state containing the aggregation inducing agent before the aggregation. This method enables the aggregation with a monovalent ionic metal salt to reduce the residual amounts of the aggregating agent after the aggregation and to reduce the residual amounts of the emulsifier, thereby improving the water resistance of the acryl-based copolymer composition. The form of addition of the aggregation inducing agent is not particularly limited. However, the aggregation inducing agent may be added in a solid state, and may be added in a liquid state dissolved in a solvent such as water.

The adding of the aggregating agent to the acryl-based copolymer to which the aggregation inducing agent is added may be a step of preparing an acryl-based copolymer composition by aggregating the acryl-based copolymer in which the aggregation inducing agent is present.

Specifically, the acryl-based copolymer composition may be prepared by adding the aggregating agent, at a temperature of 75° C. or more, to the acryl-based copolymer to which the aggregation inducing agent is previously added before adding the aggregating agent. An aggregation temperature may be, for example, 75° C. to 100° C., 75° C. to 95° C., or 78° C. to 90° C. In this temperature range the acryl-based copolymer is aggregated to improve aggregation properties of the acryl-based copolymer and to reduce the residual amounts of the aggregating agent and emulsifier in the prepared acryl-based copolymer composition, thereby improving water resistance of the acryl-based copolymer composition.

According to the present invention, there is provided an acryl-based copolymer blend. The acryl-based copolymer blend may comprise the acryl-based copolymer composition obtained as described above and a filler.

The filler may include at least one selected from the group consisting of carbon black, silica, kaolin clay, talc, and diatomaceous earth.

A content of the filler may be 20 parts by weight to 80 parts by weight, 30 parts by weight to 65 parts by weight, or 45 parts by weight to 55 parts by weight based on 100 parts by weight of the acryl-based copolymer composition. In this range, a product prepared from the acryl-based copolymer blend may have excellent workability and mechanical property.

Meanwhile, the acryl-based copolymer blend according to the present invention may further comprise sulfur in order to enhance a blend and crosslinking effect.

In addition, the acryl-based copolymer blend may optionally further comprise a crosslinking agent and a crosslinking accelerator. The crosslinking agent may be an amine compound, for example, a polyvalent amine compound.

Specific examples of the polyvalent amine compound may include an aliphatic polyvalent amine crosslinking agent, an aromatic polyvalent amine crosslinking agent, etc.

Examples of the aliphatic polyvalent amine crosslinking agent may include hexamethylenediamine, hexamethylenediamine carbamate, N,N'-dicinnamylidene-1,6-hexanediamine, etc.

Examples of the aromatic polyvalent amine crosslinking agent may include 4,4'-methylene dianiline, m-phenylenediamine, 4,4'-diaminodiphenyl ether, 3,4'-diaminodiphenyl ether, 4,4'-(m-phenylenediisopropylidene)dianiline, 4,4'-(p-phenylenediisopropylidene)dianiline, 2,2'-bis [4-(4-aminophenoxy) phenyl] propane, 4,4'-diaminobenzanilide, 4,4'-bis (4-aminophenoxy) biphenyl, m-xylene diamine, p-xylene diamine, 1,3,5-benzene triamine, 1,3,5-benzene triaminomethyl, etc.

A content of the crosslinking agent may be 0.05 parts by weight to 20 parts by weight, 0.1 parts by weight to 10 parts by weight, or 0.3 parts by weight to 6 parts by weight based on 100 parts by weight of the acryl-based copolymer. In this range, it is easy to maintain the formed crosslinked product and elasticity may be excellent.

The crosslinking accelerator may be used in combination with the polyvalent amine crosslinking agent, and may have a base dissociation constant of 10 to 106, or 12 to 106 at 25° C. in water. Specific examples of the crosslinking accelerator may include a guanidine compound, an imidazole compound, a quaternary onium salt, a tertiary phosphine compound, an alkali metal salt of weak acid, etc. Examples of the guanidine compound may include 1,3-diphenyl guanidine, di-o-tolyl guanidine, etc. Examples of the imidazole compound may include 2-methylimidazole, 2-phenylimidazole, etc. Examples of the quaternary onium salt may include tetra n-butyl ammonium bromide, octadecyl tri n-butyl ammonium bromide, etc.

Examples of the polyvalent tertiary amine compound may include triethylene diamine, 1,8-diaza-bicyclo[5.4.0]undecene-7, etc. Examples of the tertiary phosphine compound may include triphenyl phosphine, tri p-tolylphosphine, etc.

Examples of the alkali metal salt of the weak acid may include an inorganic weak acid salt such as sodium or potassium phosphate and carbonate, or an organic weak acid salt such as stearate and laurylate.

A content of the crosslinking accelerator may be 0.1 parts by weight to 20 parts by weight, 0.2 parts by weight to 15 parts by weight, or 0.3 parts by weight to 10 parts by weight based on 100 parts by weight of the acryl-based copolymer composition. In this range, a crosslinking rate may be properly maintained, and the crosslinked product may have excellent tensile strength.

According to an exemplary embodiment of the present invention, the acryl-based copolymer blend may have a Mooney viscosity ($ML_{1+4}$, 100° C.) of 10 to 70, 20 to 60, or 25 to 50. In this range, the final product may have excellent workability.

The acryl-based copolymer blend according to the present invention may further comprise additives such as a reinforcing agent, an anti-aging agent, a light stabilizer, a plasticizer, a lubricant, an adhesive, a flame retardant, an anti-fungus agent, an antistatic agent, and a coloring agent, if necessary.

A blending of the acryl-based copolymer blend according to the present invention may be performed by a suitable mixing method such as roll mixing, Banbury mixing, screw mixing, and solution mixing. Specific examples thereof may be a roll mixing method. An order of blending is not particularly limited. However, after sufficiently mixing a component that is difficult to react or decompose with heat, as a component that is easy to react or decompose with heat, for example, a crosslinking agent, etc. is preferably mixed in a short time at a temperature at which no reaction or decomposition occurs. When the acryl-based copolymer blend according to the present invention is kneaded with a roll, the composition may have a small degree of adhesion of rubber to the roll, and may have excellent workability.

In addition, a molding of the acryl-based copolymer blend according to the present invention may be performed by compression molding, injection molding, transfer molding, or extrusion molding, etc. In addition, a crosslinking method may be selected depending on a shape of the crosslinked product, and may be performed by a method of simultaneously performing molding and crosslinking, a method of crosslinking after molding, etc.

The acryl-based copolymer blend according to the present invention uses the acryl-based copolymer composition having the above constitution. Thus, flowability of the acryl-based blend may be excellent during molding, a degree of bubble generation may be low during molding, and the obtained molded body may have high mold precision.

The acryl-based copolymer blend according to the present invention may be prepared as a crosslinked product by heating. When the acryl-based copolymer blend according to the present invention is crosslinked, the obtained acryl-based copolymer may be formed into a desired shape through a molding or extrusion process, or simultaneously or subsequently cured to manufacture an article.

In addition, the manufactured article may be used as various vehicle components such as engine mount rubber, a transmission seal, a crankshaft seal, etc.

Hereinafter, the present invention will be described in detail with reference to the following examples. However, the following examples are intended to be purely exemplary of the invention. It is apparent to those skilled in the art that various changes and modifications can be made within the scope and spirit of the present invention and that the present invention is not limited thereto.

EXAMPLES

Example 1

<Preparation of Acryl-Based Copolymer Composition>

A monomer mixture consisting of 32 wt % of butyl acrylate, 50 wt % of ethyl acrylate, 15 wt % of 2-methoxy ethylacrylate, and 3 wt % of vinyl chloro acetate, and based on the 100 parts by weight of the monomer mixture, 3 parts by weight of sodium lauryl sulfate, 0.5 parts by weight of sodium metabisulfite, 0.01 parts by weight of cumene hydroperoxide, 0.02 parts by weight of sodium formaldehyde sulfoxylate, 0.05 parts by weight of tert dodecyl mercaptan, and 400 parts by weight of water were added to a polymerization reactor. Thereafter, the polymerization was initiated at a temperature of 40° C.

The polymerization was stopped when the polymerization conversion rate reached 93%. Then, after adding the aggregation inducing agent including 2.5 parts by weight of the siloxane-based copolymer represented by the following Formula 2 relative to 100 parts by weight of the monomer mixture, the resulting mixture was aggregated in an aqueous phase to which 22 parts by weight of sodium sulfate was added as the aggregating agent at a temperature of 80° C. to obtain an acryl-based copolymer composition.

[Formula 2]

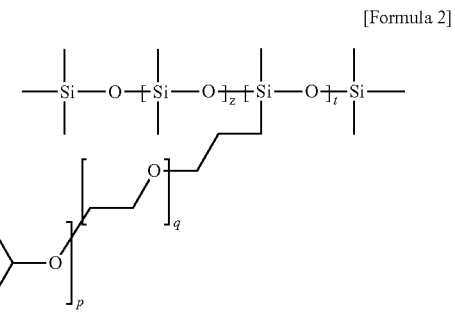

wherein z is 32, t is 1, q is 35, and p is 39.

<Preparation of Acryl-Based Copolymer Blend>

After stirring 100 parts by weight of the acryl-based copolymer composition at 50° C. for 30 seconds at 300 rpm through a Haake mixer, 50 parts by weight of carbon black, 1.0 part by weight of stearic acid, 2.0 parts by weight of an antioxidant, 0.3 parts by weight of sulfur, 0.3 parts by weight of potassium soap, and 2.5 parts by weight of sodium soap were added thereto, blended for 360 seconds at 90° C. through a roll-mill equipment to obtain an acryl-based copolymer blend.

Example 2

Example 2 was performed in the same manner as that in Example 1, except that when the acryl-based copolymer composition was prepared, the aggregation inducing agent including the siloxane-based copolymer represented by the following Formula 3 was used instead of the siloxane-based copolymer represented by Formula 2, and the amount of the added aggregation inducing agent used was adjusted in order to use 2.4 parts by weight of the siloxane-based copolymer represented by the following Formula 3 relative to 100 parts by weight of the monomer mixture (i.e., 2.4 parts by weight of the active ingredient),

[Formula 3]

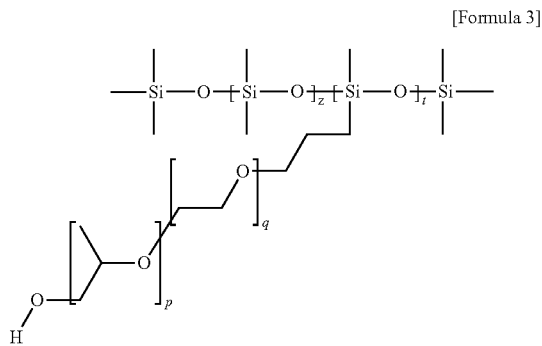

wherein
z is 25, t is 1, q is 40, and p is 32.

Example 3

Example 3 was performed in the same manner as that in Example 1, except that when the acryl-based copolymer composition was prepared, the amount of the added aggregation inducing agent of Example 1 was adjusted in order to use 0.05 parts by weight of the siloxane-based copolymer represented by Formula 2 relative to 100 parts by weight of the monomer mixture (i.e., 0.05 parts by weight of the active ingredient).

Example 4

Example 4 was performed in the same manner as that in Example 1, except that when the acryl-based copolymer composition was prepared, the amount of the added aggregation inducing agent of Example 1 was adjusted in order to use 0.1 parts by weight of the siloxane-based copolymer represented by Formula 2 relative to 100 parts by weight of the monomer mixture (i.e., 0.1 parts by weight of the active ingredient).

Example 5

Example 5 was performed in the same manner as that in Example 1, except that when the acryl-based copolymer composition was prepared, the amount of the added aggregation inducing agent of Example 1 was adjusted in order to use 4 parts by weight of the siloxane-based copolymer represented by Formula 2 relative to 100 parts by weight of the monomer mixture (i.e., 4 parts by weight of the active ingredient).

Example 6

Example 6 was performed in the same manner as that in Example 1, except that when the acryl-based copolymer composition was prepared, the amount of the added aggregation inducing agent of Example 1 was adjusted in order to use 10 parts by weight of the siloxane-based copolymer represented by Formula 2 relative to 100 parts by weight of the monomer mixture (i.e., 10 parts by weight of the active ingredient).

Example 7

Example 7 was performed in the same manner as that in Example 1, except that when the acryl-based copolymer composition was prepared, the amount of the added aggregation inducing agent of Example 1 was adjusted in order to use 11 parts by weight of the siloxane-based copolymer represented by Formula 2 relative to 100 parts by weight of the monomer mixture (i.e., 11 parts by weight of the active ingredient).

Example 8

Example 8 was performed in the same manner as that in Example 1, except that when the acryl-based copolymer was prepared, 33 parts by weight of sodium sulfate was added instead of 22 parts by weight of sodium sulfate.

Comparative Examples

Comparative Example 1

Comparative Example 1 was performed in the same manner as that in Example 1, except that when the acryl-based copolymer composition was prepared, no aggregating inducing agent was added.

Comparative Example 2

Comparative Example 2 was performed in the same manner as that in Example 1, except that when the acryl-based copolymer composition was prepared, no aggregation inducing agent was added and 33 parts by weight of sodium sulfate was added instead of 22 parts by weight of sodium sulfate.

Comparative Example 3

Comparative example 3 was performed in the same manner as that in Example 1, except that when the acryl-based copolymer composition was prepared, calcium chloride (CaCl$_2$)) was added instead of sodium sulfate.

Experimental Example

Experimental Example 1

Mooney viscosity and residual amounts of emulsifier were measured using the acryl-based copolymer compositions prepared in Examples 1 to 8 and Comparative Examples 1 to 3, and tensile strength, elongation at break and water resistance were measured using the acryl-based copolymer blend in the following manner. The results thereof are shown in Table 1 below.
  Mooney viscosity (ML$_{1+4}$, 100° C.): The Mooney viscosity was measured with a large rotor at a rotor speed of 2±0.02 rpm at 100° C. using a MV-2000 (manufactured by ALPHA Technologies). Here, after the used samples were left at room temperature (23±3° C.) for 30 minutes or more, 27±3 g of each sample was taken and poured into a die cavity, a platen was operated for 4 minutes to measure the Mooney viscosity.
  Residual amounts of emulsifier: Using energy dispersive spectroscopy analysis, 3 g of the acryl-based copolymer composition (solid content, rubber) was burned at 600° C. for 3 hours, and the resulting residue was analyzed for inorganic materials. From the obtained results, the content of the emulsifier was calculated using the content of sulfur (S).

Elongation at break and tensile strength: The acryl-based copolymer blend was first vulcanized at 160° C. for 30 minutes, and the obtained first crosslinked product was vulcanized at 180° C. for 60 minutes. The obtained vulcanized acrylic rubber was measured for tensile strength and elongation at break using a dumbbell shape No. 3 according to JIS K6251.

Water resistance: The acryl-based copolymer blend was first vulcanized at 160° C. for 30 minutes, and the obtained first crosslinked product was vulcanized at 180° C. for 60 minutes. The obtained acryl-based rubber was cut into a specimen in a dumbbell shape No. 3, and the cut specimen was immersed in distilled water adjusted to 80° C. for 70 hours according to JIS K6258, and then a change rate in tensile strength, a change rate in elongation at break, and a change rage in volume of the specimen were measured.

TABLE 1

| | Examples | | | | | | | |
|---|---|---|---|---|---|---|---|---|
| Classification | 1 | 2 | 3 | 4 | 5 | 6 | 7 | 8 |
| Aggregation inducing agent content (parts by weight) | 2.5 | 2.4 | 0.05 | 0.1 | 4 | 10 | 11 | 2.5 |
| Aggregating agent content (parts by weight) | 22 | 22 | 22 | 22 | 22 | 22 | 22 | 33 |
| Mooney viscosity | 35.6 | 33.4 | 34.1 | 34.3 | 37.1 | 35.2 | 32.8 | 33.8 |
| Residual amount of emulsifier (ppm) | 15687 | 16892 | 21578 | 19753 | 15423 | 12753 | 12548 | 29547 |
| Elongation at break (EB), % | 278 | 281 | 295 | 287 | 275 | 288 | 290 | 281 |
| Tensile strength (TS) | 101 | 100 | 101 | 99 | 102 | 101 | 101 | 101 |
| Water resistance — Change rate in tensile strength ($\Delta TS$) % | 5.3 | 7.3 | 3.4 | 4.1 | 6.5 | 5.5 | 2.5 | −2.5 |
| Change rate in elongation at break ($\Delta EB$) % | −10.1 | −12.6 | −19.9 | −14.5 | −9.1 | −15.6 | −21.4 | −37.6 |
| Change rate in volume ($\Delta V$) % | −2.1 | −2.1 | −3.1 | −2.8 | −2.5 | −2.9 | −2.9 | −2.9 |

TABLE 2

| | Comparative Examples | | |
|---|---|---|---|
| Classification | 1 | 2 | 3 |
| Aggregation inducing agent content (parts by weight) | 0 | 0 | 2.5 |
| Aggregating agent content (parts by weight) | 22 | 33 | 22 |
| Mooney viscosity | — | — | 34.7 |
| Residual amount of emulsifier (ppm) | — | — | 42597 |
| Elongation at break (EB), % | — | — | 291 |
| Tensile strength (TS) | — | — | 101 |
| Water resistance — Change rate in tensile strength ($\Delta TS$) % | — | — | −6.6 |
| Change rate in elongation at break ($\Delta EB$) % | — | — | −42.5 |
| Change rate in volume ($\Delta V$) % | — | — | −3.2 |

It could be confirmed from Table 1 that Examples 1 to 8 according to the present invention had excellent water resistance, and the residual amounts of the emulsifier were reduced to 30,000 ppm or less.

On the other hand, it could be confirmed that in the case of Comparative Example 1 in which no aggregation inducing agent according to the present invention was included, the aggregation did not occur by the addition of sodium sulfate, which is a monovalent ionic sulfate, such that an aggregate could not be obtained, and in the case of Comparative Example 2 in which the amount of sodium sulfate added was increased from 22 parts by weight to 33 parts by weight, the aggregation did not occur.

In addition, it could be confirmed that in the case of Comparative Example 3 in which calcium chloride, which is a divalent ionic metal salt, was used as the aggregating agent, the content of the residual emulsifier was high, such that the water resistance deteriorated.

The invention claimed is:

1. An acryl-based copolymer composition, comprising:
an acryl-based copolymer;
an aggregation inducing agent; and
an aggregating agent;
wherein the acryl-based copolymer includes a (meth)acrylic acid alkyl ester monomer-derived repeating unit, a (meth)acrylic acid alkoxy alkyl ester monomer-derived repeating unit, and a crosslinkable monomer-derived repeating unit,
wherein the aggregation inducing agent includes a siloxane-based monomer-derived repeating unit and an ether-based monomer-derived repeating unit,
wherein the aggregating agent includes a monovalent ionic metal salt, and
wherein the aggregation inducing agent includes a siloxane-based copolymer represented by Formula 1:

[Formula 1]

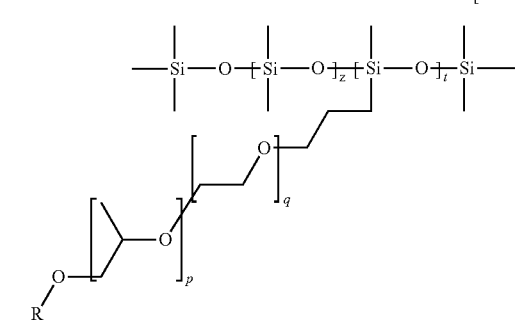

wherein
z is an integer from 5 to 50, t is an integer from 1 to 10,
q is an integer from 5 to 50,
p is an integer from 5 to 50, and
R is hydrogen or an alkyl group having 1 to 10 carbon atoms.

2. The acryl-based copolymer composition of claim 1, wherein the siloxane-based monomer includes dimethyl siloxane.

3. The acryl-based copolymer composition of claim 1, wherein the ether-based monomer is a combination of ethylene oxide and propylene oxide.

4. The acryl-based copolymer composition of claim 1, wherein the aggregation inducing agent has a weight average molecular weight of 1,000 g/mol to 200,000 g/mol.

5. The acryl-based copolymer composition of claim 1, wherein the siloxane-based copolymer represented by Formula 1 is included in an amount of 0.1 parts by weight to 10 parts by weight based on 100 parts by weight of a total acryl-based copolymer.

6. The acryl-based copolymer composition of claim 1, wherein the aggregating agent is a salt containing at least one metal selected from the group consisting of lithium, sodium, and potassium.

7. The acryl-based copolymer composition of claim 1, wherein the aggregating agent is included in an amount of 3 parts by weight to 30 parts by weight based on 100 parts by weight of a total acryl-based copolymer.

8. The acryl-based copolymer composition of claim 1, wherein the acryl-based copolymer includes 65 wt % to 93 wt % of the (meth)acrylic acid alkyl ester monomer-derived repeating unit, 5 wt % to 34.9 wt % of the (meth)acrylic acid alkoxy alkyl ester monomer-derived repeating unit, and 0.1 wt % to 20 wt % of the crosslinkable monomer-derived repeating unit.

9. A method of preparing an acryl-based copolymer composition, comprising:
   preparing an acryl-based copolymer by polymerizing a monomer mixture including a (meth)acrylic acid alkyl ester monomer, a (meth)acrylic acid alkoxy alkyl ester monomer, and a crosslinkable monomer; and
   adding an aggregation inducing agent and an aggregating agent to the acryl-based copolymer,
   wherein the aggregating agent includes a monovalent ionic metal salt, and
   wherein the aggregation inducing agent includes a siloxane-based copolymer represented by Formula 1:

[Formula 1]

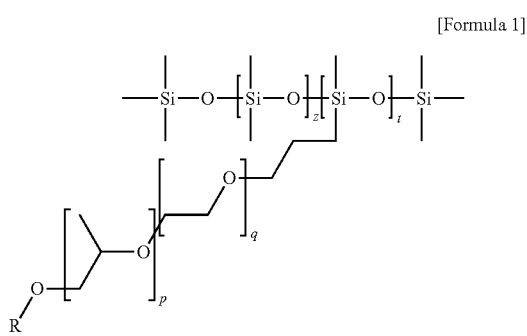

wherein
z is an integer from 5 to 50,
t is an integer from 1 to 10,
q is an integer from 5 to 50,
p is an integer from 5 to 50, and
R is hydrogen or an alkyl group having 1 to 10 carbon atoms.

10. An acryl-based copolymer blend comprising the acryl-based copolymer composition of claim 1 and a filler.

11. The acryl-based copolymer blend of claim 10, wherein the filler is one or more selected from the group consisting of carbon black, silica, kaolin clay, talc, and diatomaceous earth.

12. The acryl-based copolymer blend of claim 10, wherein the filler is included in an amount of 20 parts by weight to 80 parts by weight based on 100 parts by weight of the acryl-based copolymer composition.

* * * * *